United States Patent Office 3,346,696
Patented Oct. 10, 1967

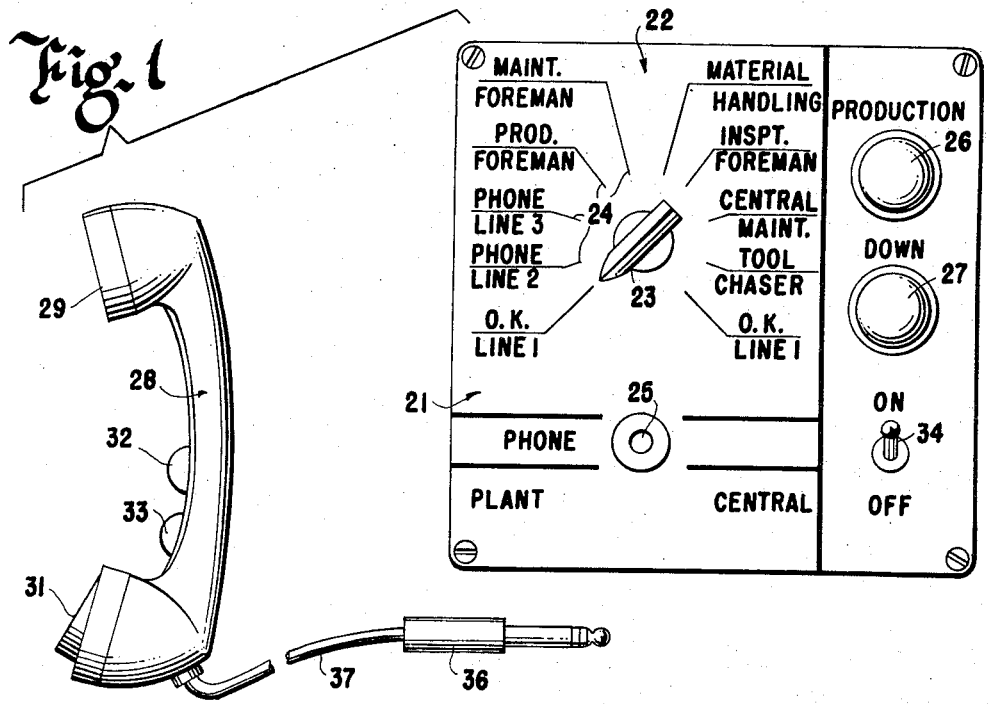

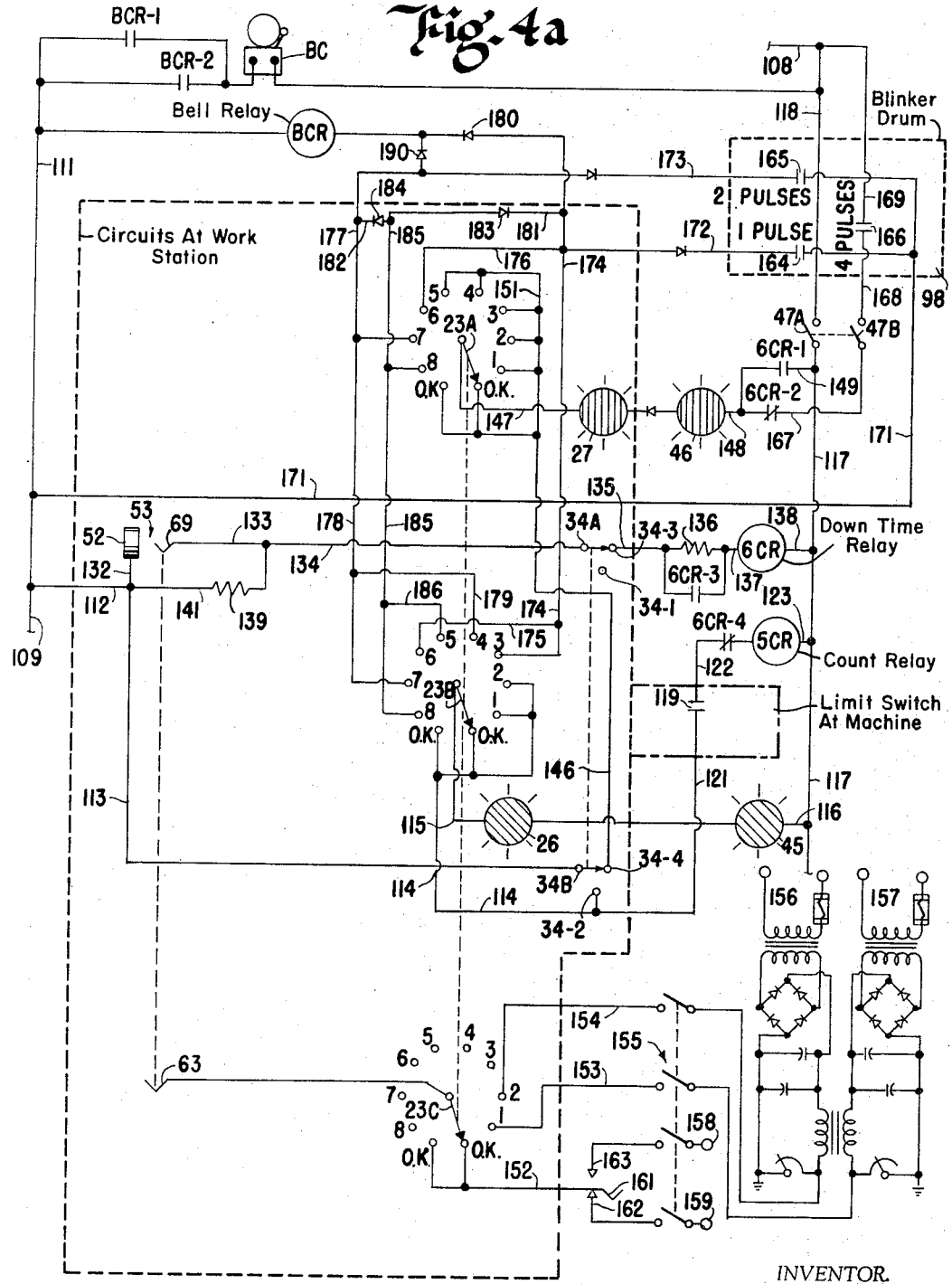

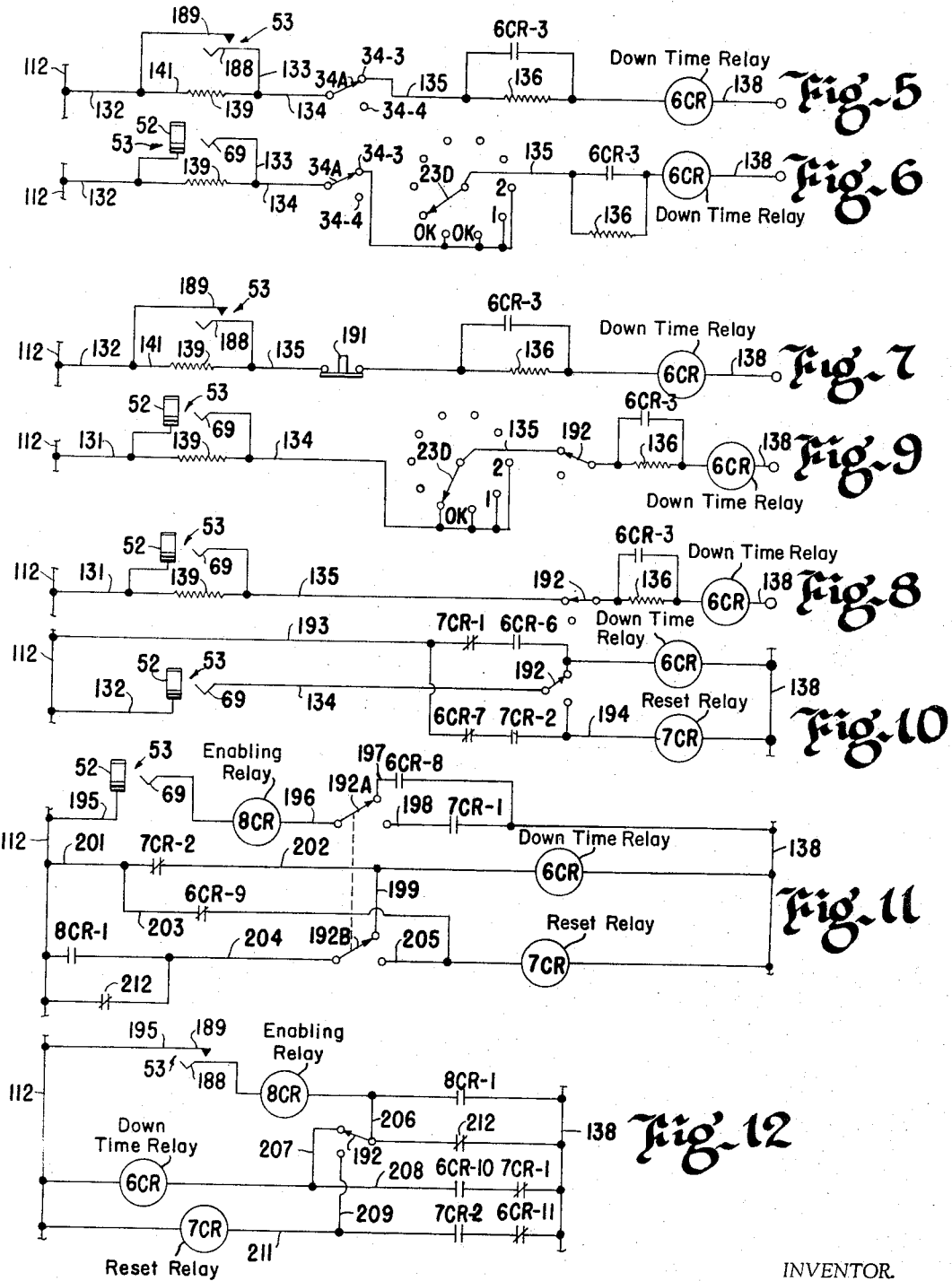

3,346,696
PRODUCTION MONITORING SYSTEM WITH PORTABLE PLUG-IN ENABLING SWITCH
Charles G. Mann, Farmington, Mich., assignor to Weltronic Company, Southfield, Mich., a corporation of Michigan
Filed Aug. 28, 1963, Ser. No. 305,172
18 Claims. (Cl. 179—2)

ABSTRACT OF THE DISCLOSURE

A production monitoring system having control elements at a work station and monitoring controls at a station remote from the work station wherein the assignment of the work station to a given production status is enabled by a portable switch which is temporarily connected into the system at the work station. In one embodiment the switch is mounted on a telephone carried by personnel having the authority to assign production status to the work station. The switch is coupled to the work station by the plug and jack of the telephone and enables a transfer switch at the work station to transfer the assigned status.

---

This invention relates to production monitoring systems and more particularly to improvements in the signals and controls for such systems for increasing the information acquired and transmitted by the system and improving the modes of controlling both the signaling the recording equipment therefor.

Heretofore it has been known to monitor the production of a machine the periods of use, non-use and set-up and the rate of operation of the machine by various types of monitoring devices including registers, pen plotters and other known information storing or readout devices such as punch cards. Further, such systems have been provided with communicating means which enable personnel at a work station or machine to signal to a central or dispatching station certain information such as requests for transfer in the authorized status of the machine or work station, requests for aid in the operation being performed at the work station or indications of the reasons for delays in operation at that station. At times, it is to the attendant's disadvantage to signal certain conditions or to order the production monitoring equipment in various fashions and therefore efforts have been undertaken to assure that responsible personnel control certain of the functions with respect to the monitoring operation. In some instances tumbler type locks which can be operated only by means of keys in the possession of responsible personnel control certain of the functions which can be performed in signaling and controlling the monitoring operation from the work station. In others, the control of the monitoring operation is maintained at the central station and therefore available only to the personnel at that station, although signals can be transmitted from the work station to the central station requesting that various monitoring operations be undertaken. Usually the latter form of system has as adjunct the voice communication with the work station such as by telephone.

An object of the present invention is to improve control, signaling and monitoring operations of systems of authorized personnel.

A second object is to restrict the controls for both signals and production of monitoring operations from the work station to responsible personnel without the utilization of complex equipment at such work stations.

Another object is to integrate means for oral communication with the means for restricting the operation of signals and monitoring operations for that station by unauthorized personnel.

A fourth object is to require proper correlation of controls at the work station with the conditions present at that station including means to verify both at the work station and central station that the monitoring controls are properly set for the operations desired.

A further object is to restrict transfer in the monitoring operation from one condition to another by unauthorized personnel at a work station.

An additional object is to expand the amount of information which can be conveyed over relatively simple equipment between a work station and a central station in a production monitoring system.

One feature of this invention resides in the use of a portable switch possession of which is restricted to authorized personnel for enabling control or for direct control of production monitoring. The switch can temporarily be connected to the production monitoring system through the equipment available at the work station whereby certain control and signaling functions best performed by authorized personnel or under the observation of authorized personnel can be accomplished by manipulation of the switch.

Another feature resides in combining the portable switch with the communication system between the work station and a central or dispatching station by integrating the switch with a telephone hand set which can be temporarily connected to the work station through a telephone plug and jack.

A third feature involves circuitry responsive to the presence of a telephone plug in a telephone jack at the work station thereby indicating the presence at the work station of authorized supervisory personnel to either signal the central station that such personnel is present or enable certain controls and signals for the monitoring operation.

Another feature resides in signaling equipment which utilizes the coded blinking of signal lamps to convey certain information between the work station and the central station. This information can include various requests from the work station for aid and the indication to the work and central station that the monitoring equipment has been properly conditioned for the intended operation and is functioning as desired.

Proper supervision by personnel at the work station has been provided by a number of different combinations of equipment, including the aforenoted switch mounted on a telephone hand set to actuate signals and controls either singly or in combination with supplemental controls at the work station or at the central station, and the use of a telephone plug to enable control circuits when inserted in a jack at the work station so that controls either at the work station, at the central station or both positions will control the monitoring and signaling operations.

A further feature resides in arranging controls so that transfers in signaling and/or monitoring of production can be effected only when authorized personnel is present, or so that selected transfers can be effected only when authorized personnel is present while other transfers can be accomplished without their presence.

An additional feature resides in a control system wherein transfers of the signaling and monitoring equipment from one condition to another can be accomplished from the central station only when the central station controls are placed in the condition which set up the current state of monitoring and signaling at the time it is indicated to those controls that responsible personnel are present at the work station to review the conditions requiring any transfer in the monitoring and signaling operation. Once those personnel are indicated to be present at the work station with the current setting at the central station in effect the central station controls can be operated to effect a program change either in signaling or monitoring or both.

In illustrating the present invention, a system has been disclosed with registers for the down time accumulated by a work station and the productive operations performed at the work station for two shifts of the factory operation together with automatic programming equipment for enabling those registers at appropriate times for a plurality of available programs. The control equipment at the work station includes automatic sensing devices responsive to productive operations, signal lamps, a multi-position tap switch which can be used by the attendant at the work station in order to call for help and for signaling purposes and a telephone jack. Supervisory personnel are provided with portable telephone hand sets which can be connected at the work station by the insertion of a plug in the telephone jack. The hand sets have a conventional push button carried on the body thereof which in conjunction with a toggle type selector switch at the work station enable the system to be transferred from the production registers to the down time register from a position at the work station. In addition, the system includes a pulse code generator which generates various frequencies and combinations of impulses applicable to the signal lamps at the work station and duplicates of the lamps at the central station in response to various settings of the controls whereby the requirements of the attendant at the work station are indicated to a dispatcher at the central station and the general condition of the monitoring equipment is indicated to personnel at both the work and central station.

Other embodiments utilizing the telephone jack and plug combination to signify the presence of supervisory personnel are illustrated wherein combinations of plug connected switches, toggle switches, and tap switches at the work station are combined with controls at the central station to provide various combinations of control of transfers of production monitoring and signaling operations.

The above and additional objects and features of this invention will be more fully appreciated from the following detailed description when read with reference to the accompanying drawings, in which:

FIG. 1 is a front view of a work station panel and the detachable telephone hand set with its connecting means;

FIG. 2 is a front view of a central station panel of one type which can be utilized in a system of the type under consideration;

FIG. 3 is a schematic circuit of the telephone hand set and the plug and jack for connecting that hand set to the work station monitoring controls;

Figure 4:
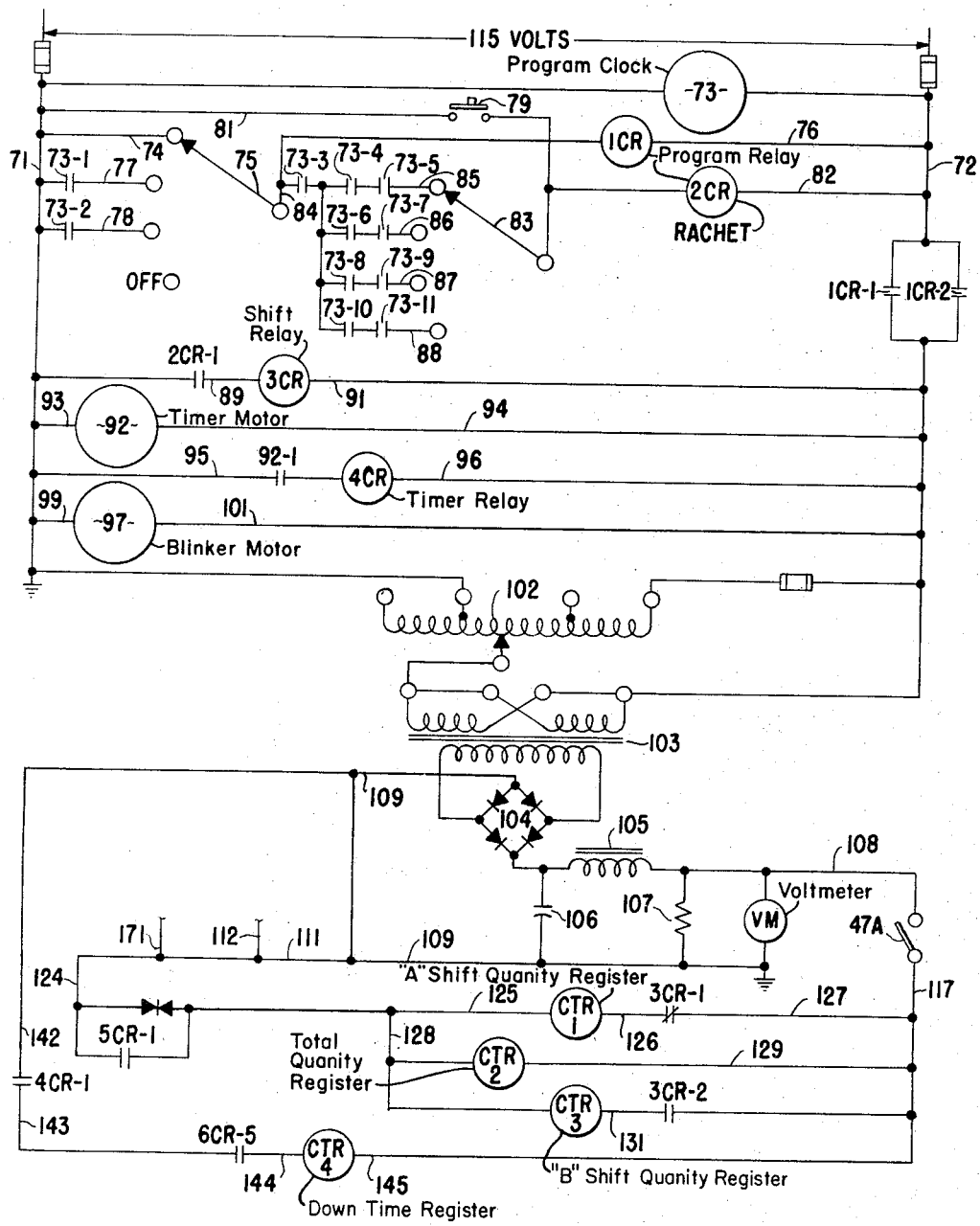

FIGS. 4 and 4a when combined represent a schematic diagram of the monitoring system for one machine showing all equipment except the telephone hand set and the plug for connecting it thereto;

FIGS. 5-12 are schematic circuits of portions of the control circuits responsive to the temporary connection of control or communication equipment with the monitoring system at the work station.

It is frequently desirable to provide means of controlling monitoring and supervisory operations from a work station in a factory and yet necessary to avoid relinquishing control of such operations to the worker or attendant assigned to the work station. In particular, central stations at which monitoring operations are performed as by registers frequently are so remote from the work station that it is desirable to have authorized persons present at the work station when the monitoring operations for that station are altered. In the example which will be considered initially here, normal operations are monitored by a register which counts production cycles. The worker is provided with signaling equipment for calling a foreman and inspector and various other personnel which he judges are needed at his work station by transmitting a signal to a central or dispatching station in response to the activation by the worker of a tap switch to a position corresponding to his determined need. When the call by the worker is answered, as by dispatching personnel from the central station, at least certain of that personnel are provided with portable switching means or indicating means which signify to the equipment that they are present at the machine or work station and/or that transfers under the monitoring operation are authorized and under supervision. Some changes in the exemplary system terminate the operation of the production cycle register and institute a register of down time. This down time register advantageously is set up to record time increments in hundredths of an hour and is driven by a pulse generator which generates electrical pulses at a rate of one hundred per hour. When the work station is returned to production, the application of pulses to the down time register is terminated and the production cycle register is reactivated.

In FIG. 1 the front panel 21 of a control and signal box at the work station is illustrated. The signal functions from the work station can be performed by the attendant at that station through the manipulation of a ten position tap switch 22 having a control knob 23 which points to indicia 24 presented in an array around the axis of the control knob. These indicia include three telephone line connections designated line 3, line 2 and line 1 wherein two positions of the switch establish connections for line 1, and call signals for the production foreman, a maintenance foreman, material handling, inspection foreman, central maintenance and a toll chaser. The phone line positions of the switch interconnect a telephone jack 25 with telephone lines at the central station which will be described below. The remaining positions of the switch establish signaling circuits which actuate signal lamps duplicated at the work station and at the central station for each work station as a first lamp 26 which conveniently may be green in color and a second lamp 27 which may be red in color. Intermittent flashing of these lamps in various coded combinations signify the calls made at the work station as will be more fully understood from the detailed consideration of the circuit of FIGS. 4 and 4a.

Additional communication from the work station is afforded through telephone connections by means of portable telephones carried by various authorized personnel in the plant such as supervisors and inspectors. A typical supervisor's hand set 28 is also shown in FIG. 1 comprising a receiver 29, a transmitter 31, a push to talk button 32 and a control button 33. The telephone hand set, by virtue of the control button, enables the supervisor when connected to the work station to effect the transfer of the monitoring operation from the productive cycle registers to the down time register when utilized in conjunction with a toggle type switch 34 on the face of the control panel 21 which is effective only when the telephone plug 36 connected through cord 37 to the hand set 28 is inserted in telephone jack 25.

The panel for each work station located at the central station and providing the monitoring and signaling functions at the central station is shown in FIG. 2. The face 38 of the panel is provided with four windows for registers 39, 41, 42 and 43 through which the counts accumulated on those registers can be read. Registers 39 and 41 accumulate the number of production cycles performed on shift A and shift B respectively, while register 42 accumulates the total number of productive cycles performed during the two shifts of operation of the factory. Register 43 accumulates down time in hundredths of an hour. Each of the registers is provided with a thumb wheel 44 for resetting its respective indicator wheels.

Signals responsive to the controls of switch 23, switch 34 and the portable switch 33 operable from the work station are indicated at the central station through the functioning of lamps 45 and 46 corresponding to lamps 26 and 27 at the work station. Panel 38 also has a toggle type switch 47 to apply and remove power to the monitoring equipment for the work station.

Voice communication with the central station is available through a loud speaker microphone system at the central station coupled to certain of the phone lines at the work station. A private communicating system is also afforded through a telephone hand set (not shown) which can be connected to the phone at the work station by inserting a telephone jack in the telephone plug 48 on panel 38, when the tap switch 23 is set at line one to exclude the loud speaker type system and incidental thereto also exclude the interconnection of any other work station with the central station. In practice, a large number of panels are mounted at a single central station and where economy dictates, certain of the controls for individual work station panels can be combined, as for example, utilizing a single phone jack for groups of three central station monitoring panels representing three different work stations within the plant.

FIG. 3 represents one form of supervisor's telephone hand set which can be used in combination with the monitoring and signaling system of this invention together with the connections for the switches carried by the hand set, the circuits of the phone plug and the phone jack with which it cooperates. A common ground is provided for both telephone and control purposes on the sleeve 49 of plug 51 which is engaged by a suitable ring type electrode 52 in the jack 53. This ground can be traced through the telephone cord 54 over lead 55 to switching point 56 for push-to-talk switch 32, lead 57, receiver 29 through return lead 58, condenser 59 and cord lead 61 to the ring 62 of plug 51 and the contact spring 63 of jack 53. When button 32 is operated, cord lead 55 is connected to the transmitter through lead 64, transmitter 31, lead 65 and cord lead 61.

The hand set construction also provides a base for a supplemental control switch 33 connected from cord ground lead 55 through lead 66 to lead 67 and plug tip 68 which is engageable with the spring contact 69 in jack 53. Thus upon closure of contact 33, a circuit is completed from jack electrode 52 to plug sleeve 49 to cord lead 55, lead 66, switch 33, lead 67, plug tip 68 and spring contact 69.

The circuits for the signals, monitoring equipment and telephone communications are illustrated in FIGS. 4 and 4a for a typical machine station and its corresponding central station equipment according to this invention. The usual plant employing this type of equipment operates on a scheduled working day which may involve one or more shifts each of which are broken up into work periods and rest periods such as lunch breaks, coffee breaks and the like. Accordingly, programming equipment is provided to synchronize the monitoring operation with the plant work schedule whereby the monitoring equipment is enabled only during the working periods of the plant. Since the timing of the idle periods of the machine during a working interval are significant and since such time intervals can best be measured in discrete time increments conveniently one one-hundredth of an hour, interval defining equipment must also be provided. The programming and interval determining equipment can be arranged to be universally applicable to a large number of monitored work stations.

In the upper portion of FIG. 4, the programming and interval defining equipment common to a number of monitored work stations is illustrated as supplied from the leads 71 and 72 conveniently connected through suitable fusing to a conventional A-C line such as a 115 volt line. A commercial programming clock 73 is connected across lines 71 and 72 so that its contacts are closed momentarily at selected times during the timing cycle of the clock. A seven day cycle is available in the illustrated clock 73. This programming clock is provided with a second form of contact identified as 73–1 and 73–2. These contacts are closed continuously on all but the seventh day of the week in the case of 73–1 and all but the sixth and seventh day of the week in the case of 73–2 to provide identification of the working days for the plant equipment. The programming relay 1CR is connected across line 71 and 72 through lead 74, switch 75 and lead 76 to close contacts 1CR–1 and 1CR–2 in lead 72 and thereby provide power to the remaining equipment of the system. The tap switch 75 enables the system to be set for a five, six or seven day program depending upon the position of the tap switch through the control of that switch and the programming clock 73. When the tap swtich is connected to lead 74, the equipment is conditioned for a seven day working week and the relay 1CR is continuously energized to continuously supply power to the remaining programming, monitoring and signaling equipment. Transfer of switch 75 to lead 77 establishes a sixth day work week wherein contact 73–1 is closed six days of the work week to supply power to the relay 1CR and open on the seventh day. Similarly if switch 75 is connected to lead 78, a five day work week is programmed by the operation of contact 73–2 to energize relay 1CR during the five working days of the week.

Definition of the work periods during the working day is effected through programming relay 2CR which is of the ratchet type and alternately closes and opens a contact for successive momentary energizations. Relay 2CR can be operated manually by closing switch 79 momentarily to complete a circuit from lead 71 through leads 81 and 82 to lead 72. Alternatively, the programming clock 73 controls operation of relay 2CR through contacts 73–3 through 73–11 and a tap switch 83 which selects one of four programs for the working day. These programs are set up through a circuit established from selector switch 75, lead 84 and any one of leads 85, 86, 87 and 88 for the different programs. Each of the leads 85, 86, 87 and 88 contains two contacts of the programmer clock 73 which must be closed simultaneously and which are closed only momentarily by the operation of the clock to apply a stepping impulse to the ratchet relay 2CR. In addition, a primary control contact 73–3 of the programmer clock is closed each time any contact of the clock is closed to connect the lead 84 to any one of the individual program leads 85 through 88.

Ratchet relay 2CR has a contact 2CR–1 which is alternately closed and opened by the energizing impulses on the relay to establish the monitoring and signaling operations of the system when it is desired to alter the monitoring operation as where a change in shift occurs by energizing relay 3CR through the circuit from leads 71 and 89 to leads 91 and 72.

Time intervals are defined by a timer motor 92 energized through leads 93 and 94 to momentarily close a timer contact 92–1 in lead 95 at regular intervals, for example, every one one-hundredth of an hour, to energize timer relay 4CR through lead 96.

The signaling system to be described includes means for flashing lights in coded combinations and at coded frequencies in various combinations to signify conditions existent at the work station. A pulse generator, which has been termed a blinker, is provided to apply the coded impulses to the signal lamps and comprises a motor 97 driving a rotating drum 98 shown as a dashed line rectangle in FIG. 4a which closes a plurality of switches at varying intervals throughout a rotation of the drum. The blinker motor 97 is energized through leads 99 and 101.

Power is supplied to the individual signaling and production monitoring equipment for a given work station through auto transformer 102 connected across leads 71 and 72, transformer 103, rectifier bridge 104 and the smoothing filter comprising choke 105, condenser 106 and the resistor 107 to impose a smooth rectified D-C on the main power leads 108 and 109 for the equipment. Negative lead 109 is held at ground.

The circuits of FIGS. 4 and 4a are interconnected at leads 111, 112 and 171 on the left side of FIGS. 4 and 4a and at lead 108 on the right side of those figures. The circuits at the work station appear on FIG. 4a and are enclosed by the dashed line on the left side of the drawing. A machine actuated limit switch 119 is shown within the rectangle of alternate dots and dashes in FIG. 4a. The remaining equipment is located at the central station.

In order to facilitate an understanding of this invention it should be noted that a number of switches illustrated are of the ganged type and have their movable connectors joined by dashed lines. Tap switch 23 at the work station has three decks with movable contactors 23A, 23B and 23C respectively. Toggle switch 34 at the work station is of the single throw double pole variety having contactors 34A and 34B. It is illustrated in the "on down time" position. Phone control switch 155 has four poles. The phone jack 53 as shown in FIG. 4a has its contact springs 69 and 63 separated to simplify the circuit drawings. Power switch 47 is shown with two poles 47A and 47B and the illustration of 47A is duplicated in FIGS. 4 and 4a.

In an ordinary working day when the A shift is working and the monitored work station is on production, the switch 23 at the work station is set at one of its "ok" positions, the toggle switch 34 at the work station is set at its off position, the production lamps 26 at the work station and 45 at the central station are illuminated, the down lamps 27 at the work station and 46 at the central station are darkened, and shift a quantity register CTR1 registers the number of productive operations occurring at the work station. The circuits for illuminating lamps 26 and 45 may be traced from the lead 109 through leads 112, 113, switch arm 34B of switch 34 at the work station connected to contact 34-2, lead 114, switch arm 23B of tap switch 23 at the work station, lead 115, lamp 26, lamp 45, lead 116, common lead 117, switch arm 47A of switch 47 at the central station, lead 118 and positive supply lead 108.

The quantity of productive operations performed during shift A with this setting is established through the operation of a suitable sensing device such as a limit switch 119 which responds to each productive operation at the machine automatically through the switch arm 34B and contact 34-2, lead 121, limit switch 119 at the work station, lead 122 to the central station, normally closed contact 6CR-4 of down time relay 6CR, the energizing coil of count relay 5CR, lead 123 and lead 117. Thus the relay 5CR is energized each time a productive operation occurs at the work station to close contacts 5CR-1 in the circuit to the actuating coil of the quantity register circuit passing energy from leads 109 and 111 to leads 124 and 125. On the A shift this energy is passed through coil CTR1 of the A production unit quantity register, lead 126, normally closed contact 3CR-1 of the shift change relay, lead 127 to lead 117 and main power lead 108. The register for the total productive units produced at the work station on both shifts A and B register 42 is driven by coil CTR2 whenever an impulse of energy appears on lead 125 by passing that energy through lead 128 to coil CTR2, lead 129 and thus lead 117. When the programming clock issues its next impulse to actuate ratchet relay 2CR, that relay opens contact 2CR-1 to drop out relay 3CR and change the shift to shift B, opening contact 3CR-1 in lead 126 and closing contact 3CR-2 in lead 131 so that the productive units register 39 driven by coil CTR1 is non-responsive to impulses at contact 5CR-1. Under these conditions the production units register for shift B, register 41, is responsive through the operation of its driving coil CTR3 from the circuit through lead 128, coil CTR3, lead 131, contact 3CR-2 and lead 117. During the operation of coil CTR3, coil CTR2 continues to operate to advance total counter 42 with register 41.

The normal working pattern at the work station may be disrupted by various conditions which dictate that the work station be transferred from production to a down status. It is desirable while in such down status to monitor the amount of time that is lost. Accordingly, a down time register 43 is provided which functions only during the interval the work station is assigned to down status. In accordance with this invention, the down status should be assigned to a work station only when it is assured that some responsible person is present at the work station to oversee its functions at time of transfer. In the embodiment of FIGS. 4 and 4a, transfer is effected through the operation of toggle switch 34 on the face of the work station control panel by transferring the switch to the "on" position wherein contactor 34A engages contact 34-3 and contactor 34B engages contact 34-4. Inasmuch as the toggle switch is available to anyone present at the work station, its transfer of position is ineffective except when enabled by an indication of the presence of appropriate authorizing personnel. Such presence is indicated by the insertion of a phone plug 36 in the jack 53 on the work station control panel and the closure of contact 33 shown in FIG. 3 to complete a circuit between the grounded sleeve electrode 52 connected to lead 112 and the tip contact spring 69 of jack 53. With switch 33 connected to the work station panel and its contact closed a circuit is completed from leads 109, 111 and 112 through lead 132, jack electrode 52, plug sleeve 49, lead 55 and 66 in the hand set, switch 33, lead 67, plug tip 68, spring contact 69, lead 133 in the control box to lead 134 extending to switch contactor 34A, switch contact 34-3, lead 135 extending from the work station to the central station, resistor 136, lead 137, down time relay 6CR, lead 138, lead 117, switch 47A, lead 118 and main power line 108. Upon pulling in, relay 6CR seals itself by closing contact 6CR-3 around resistor 136 whereby a sufficient amount of current flows through coil 6CR to hold the relay in even though plug 36 is removed from jack 53. This holding circuit bypasses the temporarily connected switch 33 through resistor 139 in lead 141. The magnitude of resistor 141 is so chosen that it permits a holding current of flow in relay 6CR when resistor 136 is bypassed. However, the combined resistance of the serially connected resistors 139 and 136 is great enough to limit the current to relay 6CR when switch 34A is closed to contact 34-3 to a level below the threshold for pull-in of that relay so that while the switch 34 is accessible to all personnel adjacent the work station, operation of the switch has no effect on the down time relay 6CR unless the authorized personnel have indicated their presence by inserting a plug in the jack 53 and have operated the push button switch 33 associated with that plug.

The pull-in of relay 6CR terminates the counting operation by opening contact 6CR-4 in the energizing circuit for count relay 5CR. It initiates the counting of the timing impulses from relay 4CR by closing contact 6CR-5 in circuit with actuating coil CTR4 of down time register 43. This circuit can be traced from lead 109 through lead 142, the intermittently closed contact 4CR-1 of timer relay 4CR, lead 143, down time relay contact 6CR-5, lead 144, coil CTR4 and leads 145, 117 and 108.

The transfer of switch 34 to the "on down time" position moves contactor 34B from contact 34-2 to open the circuit previously energizing the production indicator lamps 26 and 45 and closes that contactor to contact 34-4 to continuously illuminate down time indicator lamps 27 and 46 so long as tap switch 23 at the work station is maintained at one of the "ok" positions and so long as relay 6CR is energized to indicate down time is authorized. This circuit may be traced from contact 34-4 through lead 146, contactor 23A, lead 147, lamps 27 and 46, lead 148, contact 6CR-1, leads 149 and 117, switch 47A and leads 118 and 108. It will be noted that the "ok," "1," "2," "3," "4" and "5" positions of the A level of switch 23 each provide for the continuous illumination of the down time lamps through the lead 151. Positions "1," "2"

or the "ok" position on the C level of switch 23 would normally be set on that switch when a phone plug was inserted in jack 25 inasmuch as only those positions of the switch will connect the phone to the voice communications system. Thus as shown in FIG. 3, the phone circuit from the plug ring 62 to spring contact 63 cooperates with the contact from sleeve 49 to grounded jack contact 52 to provide a voice circuit for the phone. The jack contact 63, as depicted in FIG. 4a, is connected to the contactor 23C and thence through either of leads 152, 153 or 154 providing phone circuits from the control box at the work station to the control panel at the central station, and through a switch 155 to individual power supplies for each circuit as depicted at 156 and 157 for the circuits utilizing leads 154 and 153.

In practice, the phone circuits are arranged so that all work station phone circuits are connected to a common line whereby communication can be had between an individual work station and the central station and from the central station to any other individual work station which happens to come upon that line. In order to afford some privacy in the phone communications, a further adjunct is included in this system wherein a phone jack is provided at the central station. In the party line communication between the central station and the work station, the transducer equipment at the central station includes a permanently connected microphone and a loud speaker coupled to each of leads 154, 153 and 159. However, when a private phone communication is desired between the central station and the work station, means are arranged whereby a telephone hand set can be associated with the work station telephone isolating the talking circuit from the remaining telephone circuits in the plant by transferring from a common power supply to an individual power supply connected to terminal 158. This transfer is shown only for line 1 which normally is connected by a common power supply at terminal 159 in the manner of phone lines 154 and 153. The insertion of a telephone plug into the telephone jack 48 at the central station transfers contact 161 from contact 162 to contact 163 thereby isolating the phone line No. 1 employing lead 152 from its common party line supply at 159 and substituting the privacy line power supply (not shown) at terminal 158.

In addition to its phone control functions, switch 23 also controls the operation of the signaling devices whereby an attendant at the work station can call for help and this call can be understood and help dispatched by personnel at the central station. Further, the signaling lamps can be employed to indicate an improper setting of the monitoring equipment as where the toggle switch 34 is placed on the "on down time" position without operating the down time authorization switch 33 to pull in relay 6CR. When the switch 34 is displaced the down time authorization lamp is blinked at a rapid rate by the blinker device comprising a motor 97 and drum 98. The drum 98 is continuously rotated during the operation of the system and operates three sets of contacts 164, 165 and 166 generating one, two and four pulses per revolution. Contact 166 is placed in circuit with lamps 27 and 46 by the operation of switch 34 to the "on down time" position for any position of switch 23 so that at least 4 blinks per revolution of the drum 98 will be produced to indicate an improper setting of down time control switch 34. This will be appreciated by tracing the circuit from contact 34–4 through lead 146 and contactor 23A when that contactor is connected to either the "ok" positions or positions "one" through "five" through lead 147, lamps 27 and 46, lead 148, normally closed contact 6CR–2, lead 167, contactor 47B, lead 168, blinker contact 166, lead 169 and lead 108 to the power supply. For positions "6," "7" and "8" of switch 23A while switch 34 is "off" lamps 27 and 46 blink five, six and seven time per revolution of drum 98 since the circuit interruptions of contacts 164 and 165 are combined with those of 166. If down time relay 6CR is energized, lamps 27 and 46 are continuously illuminated for each of the "ok" positions and positions "one" through "five" of contactor 23–A while different code frequencies of blinking are produced on those lamps for positions six, seven and eight respectively of 23A.

With switch 34 in the "on down time" position, the production indicator lamps 26 and 45 are inoperative since there is no circuit from the lamps to the grounded side of the main supply through contactor 34B. With switch 34 in the "off" position, contactor 34B engages contact 34–2 to supply that ground to the lamps 26 and 45. The "ok" positions and phone positions "1" and "2" of contactor 23B will cause continuous illumination of lamps 26 and 45 as described. However, in either position of switch 34, coded combinations of blinking operations are provided on lamps 26 and 45 for positions 3 through 8 of contactor 23B while ganged contactor 23A will establish other combinations for lamps 27 and 46.

The "help" call signals are coded so that one or both of lamps 26 and 27 at the work station and 45 and 46 at the central station are flashed when the down time switch 34 is either "on" or "off." For position "3" lamps 26 and 45 blink once per revolution of drum 98, for position "4" twice per revolution and for position "5" three times per revolution while in each of these positions lamps 27 and 46 remain in a steady state either darkened, if switch 34 is "off," or lighted if switch 34 is "on" and down time has been authorized to pull in relay 6CR. For positions "6," "7" and "8" of switch 23 all of lamps 26, 27, 45 and 46 blink one, two or three times respectively per revolution of drum 98 if switch 34 is "on" and down time authorized to pull in relay 6CR while if switch 34 is "off" or if it is "on" and relay 6CR is not pulled in, lamps 26 and 45 blink one, two or three times respectively per revolution of drum 98 and lamp 27 and 46 blink five, six or seven times respectively per revolution. Thus coded signals can be generated for any combination of the settings of switches 23 and 34 to convey information from the work station to the central station.

These pulsing circuits can be traced from lead 109, 111, and 171 to contact 164 of the blinker and lead 172 for one pulse per revolution and to contact 165 and lead 173 for two pulses per revolution. The pulsing lead 172 is connected through the A and B decks of the tap switch 23 to the lamp circuits so that the single pulse is applied to the lamps 26 and 45 from lead 172 over lead 174 to position "three" and lead 175 to position "six" while that pulse is applied to lamps 27 and 46 over lead 176 to position "six" of the A deck. The two pulse lead 173 is connected to the lamps 26 and 45 over leads 177 and 178 to position "7" and 179 to position "4," while the connection of lead 177 to position "7" of the A deck of switch 23 applies those pulses to lamps 27 and 46. Three pulses per revolution of drum 98 are achieved by combining the pulses derived from leads 172 and 173 through leads 181 and 182 each isolated by a blocking rectifier 183 and 184 to lead 185 which is coupled to position "8" of the A deck of switch 23 for lamps 27 and 46 and to positions "5" and "8" of the B deck through leads 185 and 186 to lamps 26 and 45.

An audible signal is generated for each of the third through eighth position settings of switch 23 by operation of bell relay BCR which in turn closes its contacts BCR–1 and BCR–2 to actuate bell BC. Bell relay BCR is connected between lead 111 and 117 through the B deck of switch 23 in parallel with the blinker contacts 164 and 165 and is isolated partially therefrom by rectifiers 180 and 190 so that each closure of a contact drops the relay if that contact is connected in a lamp circuit by switch 23.

In the system under consideration, the return of the switch 34 to the off position de-energizes relay 6CR to remove the work station from down time and return it to production counting.

Other variants of the control of relay 6CR are available wherein the presence of responsible personnel at the work station during the energization of that relay is insured. These circuits are shown in FIGS. 5–11 and can be substituted for the circuits existing between the connection from lead 112 to 132 and the connection from lead 117 to lead 138. In these circuits elements corresponding to those in FIG. 4a are assigned the same reference characters as in FIG. 4a.

The circuit in FIG. 5 between leads 132 and 138 is quite similar to the circuit between those leads in FIG. 4a with the exception that the enabling of control by switch 34 is provided by merely inserting the telephone plug into the telephone jack 53 to displace the spring contact 188 into engagement with contact 189 whereby a circuit is completed around the resistor 139 through lead 133 to energize down time relay 6CR. Once the circuit is energized, it is sealed in the same manner as described above through the contacts 6CR–3 and thereafter is maintained so long as contactor 34A remains in engagement with contact 34–3.

FIG. 6 discloses another variant wherein the insertion of the telephone hand set connector plug 51 into jack 53 the operation of switch 33 on the hand set and the operation of switch 34 to contact 34–3 is effective only if the selector switch 23 is on a designated position, in the illustration the "ok" or phone line "1" and "2" positions. This is accomplished by providing a fourth deck to switch 23 having a contactor 23D in the circuit illustrated. The switch 33 on the telephone hand set must be closed to bypass resistor 139, although a further variation might be introduced where as shown in FIG. 5 the mere insertion of the telephone plug would close the circuit shunting resistor 139 to pass the pull in current for relay 6CR. After the relay 6CR is pulled in, it remains in so long as contactor 34A is in engagement with contact 34–3 and so long as the contactor 23D is in engagement with either of the "ok" or phone line "1" or "2" contacts on the D deck of tap switch 23. If desired, a further modification of the circuit could be established whereby the position of the contactor 23D would not be required to be maintained in order to hold in relay 6CR. This could be accomplished by placing the tap switch contactor 23D and the contacts in series with the phone jack 53 as in the lead 133 whereby once the relay 6CR had been pulled in, its hold-in current could be maintained through resistor 139 shunting both the jack and the tap switch.

In FIG. 7, the control of relay 6CR is effected solely by the insertion of the telephone plug in the jack 53. In this instance the circuit between lead 132 and lead 148 is completed by closing spring contact 188 in jack 53 on contact 189 to bypass resistor 139 and establish the pull-in current for relay 6CR. A push button actuated reset contact 191 is supplied in lead 135 to drop out relay 6CR when desired.

In many applications it is desirable to effect the control of the monitoring operation from the central station rather than at the work station. It is considered advantageous to insure the presence of supervision at the work station during the time of transfer by central station control. The circuits can be modified as illustrated in FIGS. 8–12 to provide such assurance. In FIG. 8, the plug connected switch 33 is available to complete a circuit between jack sleeve electrode 52 and tip spring contact 69 around resistor 139 so that a selector switch 192 at the central station, when closed to the lead 135, energizes the relay 6CR and completes the circuit between lead 132 and 148. This actuating circuit might be modified to merely require the insertion of a telephone plug in the jack 53 by using the type of jack contact construction including plug displaced contact 188 to engage contact 189 in shunting resistor 139 as shown in FIG. 5.

In FIG. 9, the switch 192 at the central station is enabled to control the energization of relay 6CR dependent upon two conditions being established at the work station. The first the connection and closure of the switch 33 by insertion of plug 51 in jack 53 and the positioning of the tap switch 23 so that contactor 23D is on one or more particular positions, such as "ok," "1" and "2." Again this circuit might be modified by utilizing a plug actuated switch rather than a plug connected switch at the work station.

The circuits disclosed in FIGS. 10, 11 and 12 differ further from those previously described in that they require the presence of a plug in the jack at the work station and thus the presence of responsible personnel at that work station for any transfer either from production to a down time state or return from a down time state to production for the work station monitoring operation. In the arrangement of FIG. 10 the selector switch 192 at the work station is rendered effective only when plug connected switch 33 is operated at the work station, or in the alternative with a plug actuated contactor at the work station, when a telephone plug is inserted in the jack to close the circuit between lead 132 and lead 134. It will be noted that in this circuit no shunting resistor 139 is present. Accordingly, a holding circuit is not available to the relay 6CR through the circuit established by selector switch 192. Instead a seal circuit is provided through a contact 6CR–6 and a normally closed contact 7CR–1 to lead 193 connected directly to power lead 112. A second relay 7CR is connected to the second contact of selector switch 192. It is necessary to energize 7CR in order to drop out relay 6CR. This can be accomplished only by transferring the switch 192 to a position engaging lead 194 to relay 7CR and by closing the circuit between leads 132 and 134 by the insertion of a telephone plug or a switch connected plug and the closure of the switch. When relay 7CR is pulled in by this circuit, it opens its back contacts 7CR–1 to drop out relay 6CR thereby releasing the circuit from the down time condition. If desired, relay 7CR can be sealed in by normally closed contacts 6CR–7 and seal contacts 7CR–2 which connect lead 194 to lead 193. However, if the relay 7CR is utilized only to drop out relay 6CR, it need be operated only momentarily and therefore need no seal circuit. Hence, the contacts 6CR–7 and 7CR–2 can be eliminated in those circumstances and no inter-connection lead 194 and lead 193 is necessary.

In FIGS. 11 and 12, control circuits for relay 6CR are shown which exclude any possible control of the actuation of transfer of production status from the work station and confine that control to the down time control switch 192 at the central station. In the embodiment of FIG. 11, an enabling relay 8CR can be energized only when the selector switch at the central station is positioned for selecting the operating mode currently in effect in the monitoring system. When so positioned, the insertion of the plug in jack 53 can actuate relay 8CR thereby enabling the selector switch to transfer the monitoring mode when it is repositioned. In this arrangement energy from lead 112 can be passed to relay 8CR through lead 195, jack contacts 52 and 69 connected to the plug and switch 33, coil 8CR, lead 196 and contactor 192A of switch 192 to either lead 197 or 198 both of which are connected through contacts 6CR–8 and 7CR–1 respectively to lead 138. Assuming that the system is on down time and that relay 6CR is energized so that contact 6CR–8 is closed, relay 8CR can be energized only when the contactor 192A is connected to lead 197, since that is the only circuit available to lead 138. At this time ganged contactor 192B of switch 192 is connected to lead 199 and thus to relay coil 6CR while relay 6CR is energized through lead 201, normally closed contacts 7CR–2 and lead 202. Relay 7CR is de-energized at this time inasmuch as its lead 203 containing normally closed contacts 6CR–9 is opened at those contacts. Further, lead 204 connected to contactor 192B is opened until relay 8CR is picked up to close contact 8CR-1. Thus until the relay 8CR is picked up the transfer of contact 192B to lead 205 has no effect and 7CR remains de-energized. However, if prior to the transfer of contactor 192B to lead 205 relay 8CR is picked up by the insertion of a plug in jack 53 and the closure switch 33 or in the alternative where a plug actuated contact closure is effected by the insertion of a plug in the jack 53, contact 8CR-1 is closed and the transfer of switch 192B to lead 205 will pull in 7CR provided relay 8CR has a sufficiently slow dropout interval to hold contact 8CR-1 closed during the transfer time of the switch 192. Such a slow release relay is well known in the art and readily available. When contactor 192B is connected to lead 205, relay 7CR pulls in opening its back contacts 7CR-2 to drop relay 6CR and release the "down time" condition of the registers and signals returning the system to productive time. Further, if a return from this condition is desired, it can be effected only with the switch 192 in the position it assumes to return the system to production monitoring inasmuch as the contactor 192A must be in engagement with lead 198 to provide a circuit which can be completed by the insertion of a plug in jack 53, this completion being effected through the then closed contact 7CR-1 of relay 7CR which has been sealed in through the now closed back contact 6CR-9. Thus the return from productive time to down time can be effected after 8CR is again pulled in by the presence of the plug in jack 53 through the transfer of switch 192 so that the contactor 192B is connected to lead 199 and relay 6CR is pulled in.

FIG. 12 shows an alternative circuit for insuring that the transfer of monitoring operations can be effected only from the switch 192 which, when located at the central station, restricts transfer to central station attendants. In this arrangement the enabling relay 8CR is illustrated as being enabled through a plug actuated contact closure utilizing contacts 188 and 189 as previously described. These contacts, located at the work station, when closed, while the switch 192 is in the position for the current monitoring state, enables the energization of relay 8CR from lead 112 through lead 195, contacts 189 and 188, lead 206, contactor 192 and, in the case where the authorized down time condition exists and contactor 192 engages lead 207, through lead 207 to lead 208, contacts 6CR-10, normally closed 7CR-1 and lead 138. With 8CR energized, it closes its contact 8CR-1 thereby connecting lead 138 to switch 192 so that that switch can be transferred to lead 209 to energize relay 7CR through lead 112, lead 211, lead 209, switch 192, lead 206 and contact 8CR-1. When the relay 7CR pulls in, it drops the relay 6CR by opening contacts 7CR-1 and seals itself by closing contacts 7CR-2. At this point a removal of the plug to open contacts 189 and 188 and drop relay 8CR has no effect on the relays 6CR and 7CR. If a further transfer of the condition of these relays is desired, however, the relay 8CR must again be energized and this can be accomplished only while the switch 192 is in the position in which it pulled in the relay 7CR. When in that position, the 8CR energizing circuit is available through switch 192, lead 209 and contacts 7CR-2 and 6CR-10 to lead 138. With 8CR pulled in to close its contact 8CR-1, the transfer back to an energized state for relay 6CR can be effected by transferring contactor 192 to lead 207.

In FIG. 12 the mutually exclusive features for relays 6CR and 7CR and the operation of those relays is available only so long as one or the other of the two is energized. In the event of a power failure or the opening of the supply by the programming functions, some means must be made available to energize one or the other of these relays since both will be dropped out. This means is a slow to pick up power responsive switch 212 which is normally closed when the power is turned off and opens an interval after power is returned to the leads 112 and 138. Under these circumstances, depending upon the position of switch 192, one or the other of relays 6CR and 7CR will be energized and the control of down time and production monitoring will be made effective in the system.

As noted above, in each of the circuits of FIGS. 5–12, the relay 6CR and its control circuits are substituted for relay 6CR and its controls of FIG. 4a and relay 6CR is provided with contacts 6CR-1, 6CR-2, 6CR-4 and 6CR-5 as shown in FIG. 4a and performs the functions of introducing the operation of down time register 43 and down time indicator lamps 27 and 46 while terminating any response by quantity registers 42 and 39 or 41.

While the above description of the signaling means and monitoring control means have been applied to a particular production monitoring system, it is to be appreciated that it could be equally well applied to other such systems and expanded in scope whereby more than one relay functioning as the relay 6CR to set up particular monitoring conditions could be utilized. Thus other forms of registers for other conditions might be utilized including productive time or the number of parts remaining to be processed in a run or the number of overtime operations falling outside of a given time limit or undertime operations might be recorded together with the excess or deficiency in the operating interval, all without departing from the spirit of this invention. Therefore, it is to be understood that this description is to be read as illustrative of the principles of this invention and not in a limiting sense.

Having described the invention, I claim:

1. A production monitoring system including registers for time and productive operations, visual signals, and voice communication means comprising a work station, a monitoring station remote from said work station and having said registers for time and productive operations monitoring said work station, relay means at said remote station for altering the monitoring operation for said work station, a first switch at said work station for controlling said relay means, a telephone hand set, a manually operable switch on said hand set, a plug connected to said hand set and said switch on said hand set, a jack for said plug at said work station, a first pair of contacts for said jack and plug to establish a telephone circuit with said remote station, a second pair of contacts for said jack and plug to connect said hand set mounted switch to said work station, said hand set mounted switch and said first switch establishing a circuit to alter the operation of said relay means, a first resistance in series with said relay means, means to bypass said resistance when said relay means is operated, a second resistance across said second pair of jack contacts so proportioned as to pass current sufficient to maintain said relay means operated when said first resistance is bypassed and insufficient to operate said relay means when said first resistance is unbypassed whereby said telephone plug can be removed from said jack upon operation of said relay means.

2. A production monitoring system including registers for time and productive operations, visual signals, and voice communication means comprising a work station, a monitoring station remote from said work station and having said registers for time and productive operations monitoring said work station, means at said remote station for altering monitoring from a first to a second condition in response to a signal exceeding a first level and for maintaining when established by said first level said second monitoring condition in response to a signal exceeding a second level below said first level, a telephone hand set, a manually operable switch on said hand set, a plug connected to said hand set and said switch, a jack for said plug at said work station, a first pair of contacts for said jack and plug to establish a telephone circuit with said remote station, a second pair of contacts for said jack and plug to connect said switch to said work station whereby said switch can apply a signal exceeding said first level to said altering means, and an impedance across said second pair of contacts for said jack to maintain a signal to said altering means between said first and second levels.

3. A production monitoring system including monitoring means comprising a work station, a monitoring station remote from said work station and having said monitoring means, a jack at said work station, a portable switch, a plug connected to said switch for insertion in said jack, means at said monitoring station for altering monitoring from a first condition to a second condition in response to a signal exceeding a first level and for maintaining when established by said first signal level said second condition in response to a signal exceeding a second level below said first level, a pair of contacts of said jack interconnected by operation of said switch to apply a signal exceeding said first level to said altering means, and an impedance across said pair of contacts for said jack to maintain a signal to said altering means between said first and second levels.

4. A combination according to claim 3 wherein said impedance is a resistance and including a second resistance in series with said altering means and means to bypass said second resistance while said altering means is in said second condition.

5. A production monitoring system including monitoring means comprising a work station, a monitoring station remote from said work station, a switch at said work station, means at said monitoring station for altering monitoring from a first condition to a second condition in response to a signal exceeding a first level and for maintaining when established by said first signal level said second condition in response to a signal exceeding a second level below said first level, and an impedance across said switch to maintain a signal to said altering means between said first and second levels.

6. A production monitoring system including a work station, means at said work station responsive to each of a succession of production operations, a monitoring station remote from said work station, monitoring equipment at said monitoring station for monitoring operations at said work station in a multiplicity of monitoring modes, said monitoring equipment including means responsive to operation of said production operation responsive means, a jack at said work station, a plug fitting said jack, and means to enable a transfer of said monitoring equipment between monitoring modes in response to the insertion of said plug in said jack.

7. A combination according to claim 6 wherein said jack is provided with a plug actuated switch responsive to the insertion of said plug in said jack to enable said change in the operation of said monitoring equipment.

8. A combination according to claim 6 wherein said jack couples a manually actuable switch to said work station as said means to enable the transfer of said monitoring equipment between monitoring modes.

9. A production monitoring system comprising a work station, a monitoring station remote from said work station, monitoring equipment at said monitoring station for monitoring operations at said work station, a telephone set, means temporarily to associate said telephone set with said work station for voice communication with said monitoring station, means for altering the monitoring operation, means responsive to the association of said telephone with said work station for enabling said altering means, and switching means at said monitoring station for actuating said altering means when the operation of said altering means has been enabled.

10. A combination according to claim 9 including manually operable switching means at said work station cooperating with said means responsive to the association of said telephone with said work station to enable said altering means.

11. A production monitoring system comprising a work station, a monitoring station remote from said work station, monitoring equipment at said monitoring station for monitoring operations at said work station, a portable switch means temporarily to associate said portable switch with said work station, means for altering the monitoring operation enabled by said portable switch, and switching means at said monitoring station for actuating said altering means when the operation of said altering means has been enabled.

12. A production monitoring system comprising a work station, a monitoring station remote from said work station, monitoring equipment at said monitoring station for monitoring operations at said work station, a signal lamp at said monitoring station, a manually operable multiple condition switching means at said work station for controlling the operation of said signal lamp, a portable switching means, means to temporarily associate said portable switching means with said work station, means for altering the monitoring operation enabled by said portable switching means only when said multiple condition switching means is in a given condition, and switching means at said monitoring station for actuating said altering means when the operation of said altering means has been enabled.

13. A production monitoring system comprising a work station, a monitoring station remote from said work station, monitoring equipment at said monitoring station for monitoring operations at said work station, a pair of signal lamps at said monitoring station, a signal code generator for said lamps to provide a plurality of combinations of intermittent illumination thereof, a manually operable multiple condition switching means at said work station for selecting code combinations of said generator, a portable switching means, means to temporarily associate said portable switching means with said work station, means for altering the monitoring operation enabled by said portable switching means only when said multiple condition switching means is in a given condition, and switching means at said monitoring station for actuating said altering means when the operation of said altering means has been enabled.

14. A production monitoring system comprising a work station, a monitoring station remote from said work station, monitoring equipment at said monitoring station for monitoring operations at said work station, selectively conditioned control means at said monitoring station for establishing for each of a plurality of conditions a different given monitoring condition, and means for enabling said control means to alter monitoring conditions only when said control means is conditioned for the currently effective given monitoring condition.

15. A combination in accordance with claim 14 including a portable switching means and means to associate said portable switching means with said work station to actuate said enabling means.

16. A production monitoring system comprising a work station, a monitoring station remote from said work station, monitoring equipment at said monitoring station for monitoring operations at said work station, a telephone set, means temporarily to associate said telephone set with said work station for voice communication with said monitoring station, selectively conditioned control means at said monitoring station for establishing for each of a plurality of conditions a different given monitoring condition, and means responsive to the association of said telephone with said work station for enabling said control means to alter monitoring conditions only when said control means is conditioned for the currently effective given monitoring condition.

17. A production monitoring system including a work station, a monitoring station remote from said work station, monitoring equipment at said monitoring station for monitoring operations at said work station, said monitoring equipment having a first operative state and a second operative state, a manually operable switch at said work station for controlling the transfer of said monitoring equipment between said first and second operative states, a portable switch for enabling said manually operable switch to transfer said monitoring equipment between said first and second operative states, a means for temporarily connecting said portable switch to said work station.

18. A production monitoring system including a work station, a monitoring station remote from said work station, monitoring equipment at said monitoring station for monitoring operations at said work station, said monitoring equipment having a first operative state and a second operative state, a manually operable switch at said monitoring station for controlling the transfer of said monitoring equipment between said first and second operative states, a portable switch for enabling said manually operable switch to transfer said monitoring equipment between said first and second operative states, and means for temporarily connecting said portable switch to said work station.

References Cited

UNITED STATES PATENTS 3,187,334  6/1965  Humphrey ---------- 179—2 X
3,277,243  10/1966  Fairbairn.

JOHN W. CALDWELL, *Acting Primary Examiner.*

DAVID G. REDINBAUGH, *Examiner.*

J. T. STRATMAN, *Assistant Examiner.*